UNITED STATES PATENT OFFICE.

ALPHONSE FRIEDRICK, OF BROOKLYN, NEW YORK.

MANUFACTURING GLASS FOR USE IN ILLUMINATED WINDOWS.

SPECIFICATION forming part of Letters Patent No. 258,402, dated May 23, 1882.

Application filed October 10, 1881. (No specimens.)

*To all whom it may concern:*

Be it known that I, ALPHONSE FRIEDRICK, a citizen of the United States, residing at Nos. 16 and 18 Hoyt street, Brooklyn, in the county of Kings and State of New York, have invented a new and useful Improvement in Manufacturing Glass for Use in Illuminated Windows; and I do hereby declare the following to be a full, clear, and exact description of the invention, which will enable others skilled in the art to which it appertains to use the same.

My invention is intended to save the labor and expense of cutting plain and ornamental glass into the vast variety of shapes that are used in lead sash for illuminated windows in churches and domestic work where it is necessary to cut many pieces of glass of the same size and shape.

To fully explain the usefulness of my invention it is necessary first to state that in the art of making decorative windows the design is first made, from which a cutting-pattern is made for each separate size and shape of glass. Then each separate piece of glass is cut by hand with the aid of the pattern as a guide.

I attain the object of saving the expense and labor of cutting glass into the required number of pieces of each shape and size in the following manner: I first cast a level bed of plaster of the required size and sufficiently thick for purposes of strength, on which the design or cutting pattern is to be drawn in lines. Then cut out the lines equal to the thickness of glass to be used in depth and about a sixteenth of an inch in width. From this mold an iron plate is cast which will have the lines raised which are to form the joints between the glass. The melted glass is then to be poured on the iron-plate mold, above described, and rolled out in the usual manner of rolling glass, and at the same time the lines or ribs on the plate cutting the glass into the required shapes and sizes.

I do not claim the manner of making the iron-plate mold; nor do I claim the use or right of the ribbed iron plate for the purpose of leaving a design or impression upon the glass rolled thereon; but What I do claim, and desire to secure by Letters Patent, is—

The hereinbefore-described process of molding glass sections for illuminated windows, which consists in first forming a sectional pattern-matrix of the complete design, and then pressing or rolling the melted glass into the matrix, thereby forming the design in sections as required for use.

ALPHONSE FRIEDRICK.

Witnesses:
   FRED. E. LOCKWOOD,
   JAMES P. STEVENSON.